United States Patent Office 3,580,956
Patented May 25, 1971

3,580,956
HYDROXYLATION OF AROMATIC COMPOUNDS
Herman S. Bloch, Skokie, Ill., assignor to Universal Oil Products Company, Des Plaines, Ill.
No Drawing. Filed Nov. 3, 1967, Ser. No. 680,311
Int. Cl. C07c 37/00, 39/00, 39/06
U.S. Cl. 260—621                                    9 Claims

ABSTRACT OF THE DISCLOSURE

The hydroxylation of an aromatic compound wherein an aromatic compound is reacted with hydrogen peroxide in contact with an acidic crystalline aluminosilicate catalyst at hydroxylation conditions. The aromatic compound is employed in molar excess with respect to hydrogen peroxide, and the catalyst contains a rare-earth metallic component.

---

The present invention relates to a process for effecting the hydroxylation of aromatic compounds, and is particularly directed toward a process for the hydroxylation of an aromatic compound with hydrogen peroxide at hydroxylation conditions and in contact with an acidic crystalline aluminosilicate catalyst.

Products of the hydroxylation of an aromatic compound with hydrogen peroxide find a wide variety of uses in commercial industries. The cresol and dihydroxy benzene isomers are used in phenolic resins, lubricating oil additives, wire enamel solvents, photographic developers, as disinfectants, antioxidants, and as intermediates for perfumes and dyes. The nitrophenol isomers are used in organic synthesis for the manufacture of rhodamine dyestuffs, phenacetin, etc. In addition, the dihydroxynaphthalene isomers are used in organic synthesis for dyestuffs and pharmaceuticals, and medicinally as an antiseptic and antifermentative. Examples of the hydroxylated aromatic compounds which may be prepared according to the process of this invention include the hydroxytoluene isomers, the hydroxyethylbenzene isomers, the dihydroxybenzene isomers, the nitrophenol isomers, the naphthol isomers, the methylhydroxy naphthalene isomers, the dihydroxy naphthalene isomers, the mono- and dihydroxybiphenyl isomers, the methylhydroxy anthracene isomers, etc.

An object of the present invention is to provide a process for the production of hydroxylated aromatic compounds. A further object is to provide a catalytic process which is effected under conditions which enhance catalyst activity. A corollary objective is to provide a process which is effected under conditions to increase selectivity in production of the desired hydroxylated aromatic compounds.

The starting materials utilized in the process of this invention comprise aromatic compounds and hydrogen peroxide. More specifically, the aromatic compounds utilized in the process of this invention will include alkylated aromatic compounds such as toluene, the xylene isomers, ethylbenzene, the methylnaphthalene isomers, the dimethylnaphthalene isomers, the diethylnaphthalene isomers, ethylbiphenyl, etc.; halogen substituted aromatics such as the chlorotoluene isomers, the chloroethylbenzene isomers, the chloroethyl and chloromethyl naphthalene isomers, etc.; hydroxy substituted aromatics such as the cresol and dihydroxybenzene isomers, the mono- and dihydroxy substituted naphthalene isomers, etc.; the nitro substituted aromatics such as nitrobenzene, the isomers of nitronaphthalene and nitrobiphenyl, the nitrotoluene isomers, the isomers of nitroethylbenzene, etc.; the amino substituted aromatics such as aniline, N,N-dimethylaniline, diphenylamine, the aminomethylnaphthalene isomers, etc.; the sulfonic substituted aromatics such as benzenedisulfonic acid and its isomers, benzene sulfonic acid, etc. The aforementioned compounds represent the types of aromatics, derivatives thereof, and combinations thereof that may be utilized as a starting material in the process of this invention. It is understood that this invention is not necessarily limited thereto, however.

A broad embodiment of this invention is found in a process for the hydroxylation of an aromatic compound which comprises reacting said aromatic compound with hydrogen peroxide at hydroxylating conditions and in contact with an acidic crystalline aluminosilicate containing catalyst.

Other embodiments of this invention reside in particular operating conditions and the particularly preferred acidic crystalline aluminosilicate catalysts utilized; the former referring to hydroxylation conditions including a temperature within the range from about 25° C. to about 300° C. and a molar ratio of aromatic compound to hydrogen peroxide of at least 1.1:1.0 (preferably a ratio of from 2.4:1.0 to 15:1.0); the latter referring to a catalyst comprising from about 10% to about 80% by weight of a crystalline aluminosilicate selected from the group consisting of faujasite and mordenite, and from about 1% to about 15% by weight of a metal commonly called a rare-earth metal calculated as the element and based on the amount of crystalline aluminosilicate. The rare-earth metals, known to those familiar in the art, are lanthanum, cerium, praseodymium, neodymium, promethium, samarium, europium, gadolinium, terbium, dysprosium, holmium, erbium, thulium, ytterbium, etc. In some instances, mixtures of two or more of the rare-earth metals may be suitably employed with the crystalline aluminosilicate catalyst.

A further embodiment of this invention is found in a process for the hydroxylation of an aromatic compound which comprises reacting said aromatic compound with hydrogen peroxide, said aromatic compound being a substituted polycyclic compound.

The process of this invention is effected by reacting an aromatic compound with hydrogen peroxide at hydroxylating conditions and in contact with an acidic crystalline aluminosilicate catalyst. It is preferred that the reaction be effected in a hydrous medium containing less than 7.5 weight percent water. Increased amounts of water will tend to reduce yields of the intended hydroxylated aromatic compound. It is further preferred that the reaction be effected at a temperature which includes a range from about 25° C. to about 300° C. and preferably a range from about 40° C. to about 150° C. The preferred reaction pressure will be within the range of from about one atmosphere to about 10 atmospheres.

The following specific examples serve to illustrate the process of this invention and the benefits afforded by the use thereof; they are not intended to limit the scope of the invention as set forth in the appended claims.

EXAMPLE I

In this example a charge stock, which previously had been observed to be stable in glass to moderate increases in temperature, consisting of a mixture of 89.3 weight percent phenol, 7.5 weight percent water, and 3.2 weight percent hydrogen peroxide was charged in an upflow manner to a vertical glass jacketed reactor which contained a fixed bed of catalyst. A sliding thermocouple was placed in the center of the catalyst bed and was moved axially through the catalyst bed, during this experiment, to determine temperatures at various distances through the center of the bed. The recorded temperatures were averaged to obtain an average catalyst bed temperature. The catalyst used in this example, was an acidic crystalline aluminosilicate catalyst containing about 80% by weight of faujasite and about 8% by weight of mixed rare-earths, comprising lanthanum, cerium and praseodymium, with traces of neodymium, calculated as the elements.

Prior to introduction of the charge stock (start-up of the fixed bed experiment) the catalyst was prewetted with water. The excess water used for prewetting was drained from the catalyst bed and the charge stock was then immediately charged to the catalyst bed. The water used in prewetting the catalyst did not noticeably change the water content of the material contacting the catalyst. The average catalyst bed temperature was increased to 84° C. after the charge was cut into the reactor.

The average catalyst bed temperature was maintained at about 84° C. with a regulated external temperature controller while the charge stock was being passed through the fixed bed of catalyst.

Gas-liquid chromatography analysis of the resulting effluent indicated a content of about 4.3 weight percent dihydroxybenzenes.

Selectivity of conversion to form the dihydroxybenzenes on a weight ratio of dihydroxybenzenes over all products formed (including tars, etc.) was about 42%. The dihydroxybenzenes consisted of hydroquinone (60 wt. percent) and catechol (40 wt. percent).

EXAMPLE II

In this example, 141 grams of phenol was charged to a 1-liter glass alkylation flask equipped with a dropping funnel and a suitable mechanical stirrer. The phenol was heated up to 54° C. in the flask and 7 grams of an acidic crystalline aluminosilicate catalyst containing about 10% by weight of mordenite and about 1% by weight, calculated as the element, of europium, was added to the liquefied phenol. The mixture of phenol and catalyst was stirred while 17.5 grams of 30% by weight aqueous hydrogen peroxide was slowly added over a 1.2 hour period at a temperature of about 54° C. The mixture was then stirred an additional 3.9 hours holding the temperature in the flask constant. The product was then cooled and filtered. Infrared analysis of the filtered effluent and the material recovered from the washed catalyst indicated a total of about 6.8 weight percent dihydroxybenzene in the total product. Dihydroxybenzene yields based on the hydrogen peroxide charged were about 63 mol percent. The selectivity of the formation of dihydroxybenzene determined as a weight ratio of dihydroxybenzene over other products formed, i.e. tars, etc., was about 2:1.

The above specification, and examples used therein, clearly illustrate the use of the present invention for the hydroxylation of an aromatic compound and the benefits afforded by the use of said invention.

I claim as my invention:

1. A process for the nuclear hydroxylation of an aromatic compound selected from the group consisting of
   (a) mono- or di-substituted benzene in which the substituent(s) are selected from the group consisting of methyl, ethyl, cholorine, —OH, —NO$_2$, —SO$_2$OH, —NH$_2$, —N(CH$_3$)$_2$ and

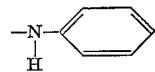

(b) mono- or di-substituted naphthalene in which the substituent(s) are selected from the group consisting of methyl, ethyl, chlorine, —OH, —NO$_2$ and —NH$_2$; and
   (c) mono-substituted biphenyl in which the substituent is ethyl or —NO$_2$ which process comprises reacting said aromatic compound with hydrogen peroxide, at a temperature of about 25° C. to about 300° C. and a molar excess of said aromatic compound to hydrogen peroxide of at least 1.1 to 1, in contact with an acidic crystalline aluminosilicate catalyst comprising faujasite or mordenite.

2. The process of claim 1 further characterized in that said temperature is in the range of about 40° C. to about 150° C.

3. The process of claim 1 further characterized in that said catalyst contains from about 10% to about 80% by weight of faujasite or mordenite.

4. The process of claim 1 further characterized in that said catalyst comprises from about 1% to about 15% by weight, based on said catalyst, of a rare-earth metal.

5. The process of claim 2 further characterized in that said molar excess of aromatic compound over hydrogen peroxide is in the range of about 2.5:1.0 to about 15.0:1.0.

6. The process of claim 5 further characterized in that the reaction is effected in a hydrous medium containing less than 7.5 wt. percent water.

7. The process of claim 1 further characterized in that said aromatic compound is a substituted benzene.

8. The process of claim 1 further characterized in that said aromatic compound is a substituted naphthalene.

9. A process for the hydroxylation of phenol which comprises reacting phenol with hydrogen peroxide in contact with an acidic crystalline aluminosilicate catalyst at hydroxylating conditions including a temperature in the range of about 40° C. to about 150° C. and a molar excess of said phenol to hydrogen peroxide of at least 1.1:1.0; said process further characterized in that said catalyst comprises from about 10% to about 80% by weight of a crystalline aluminosilicate selected from the group consisting of mordenite and faujasite and from about 1% to about 15% by weight, based on said crystalline aluminosilicate catalyst, of a rare-earth metal.

References Cited 2,395,638    2/1946    Milas _____ 260—621X
3,371,110    2/1968    Hamilton et al. ____ 260—621X BERNARD HELFIN, Primary Examiner N. P. MORGENSTERN, Assistant Examiner U.S. Cl. X.R.

260—571, 574, 575, 512, 622, 623, 624, 620